No. 849,883. PATENTED APR. 9, 1907.
L. H. BRINKMAN.
FLANGED METAL PIPE.
APPLICATION FILED JULY 20, 1905.
2 SHEETS—SHEET 1.
Fig. 1.
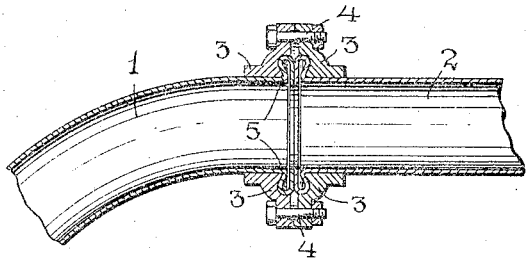
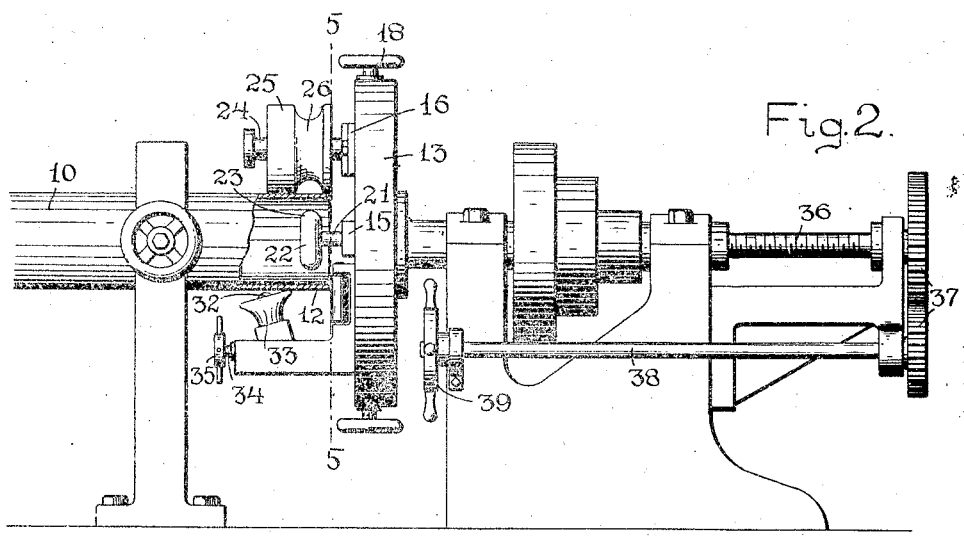
Fig. 2.
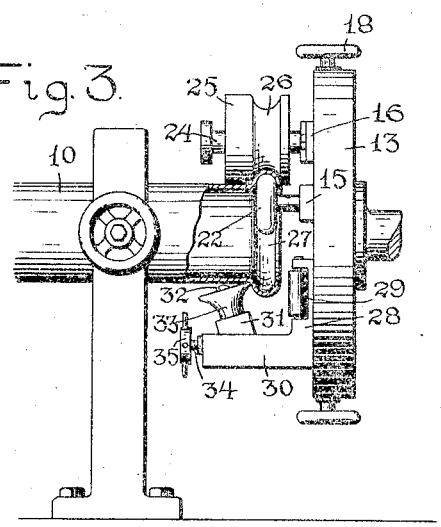
Fig. 3.
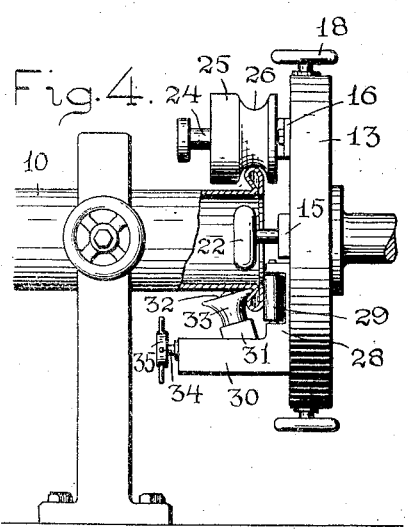
Fig. 4.
Witnesses
Roy D. Tolman.
Penelope Cumberbach.
Inventor
Louis H. Brinkman
By Rufus B. Fowler
Attorney No. 849,883. PATENTED APR. 9, 1907.
L. H. BRINKMAN.
FLANGED METAL PIPE.
APPLICATION FILED JULY 20, 1905.

2 SHEETS—SHEET 2.

Witnesses
Roy D. Tolman.
Penelope Kreidebach.

Inventor
Louis H. Brinkman.
By Rufus B. Fowler
Attorney

UNITED STATES PATENT OFFICE.

LOUIS H. BRINKMAN, OF HARTFORD, CONNECTICUT, ASSIGNOR TO WHITLOCK COIL PIPE COMPANY, OF WEST HARTFORD, CONNECTICUT, A CORPORATION OF CONNECTICUT.

FLANGED METAL PIPE.

No. 849,883.      Specification of Letters Patent.      Patented April 9, 1907.

Application filed July 20, 1905. Serial No. 270,500.

*To all whom it may concern:*

Be it known that I, LOUIS H. BRINKMAN, a citizen of the United States, residing at Hartford, in the county of Hartford and State of Connecticut, have invented a new and useful Improvement in Flanged Metal Pipes, of which the following is a specification, accompanied by drawings, forming a part of the same, in which—

Figure 5:
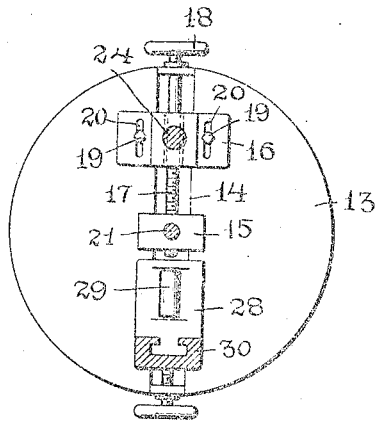
Figure 6:
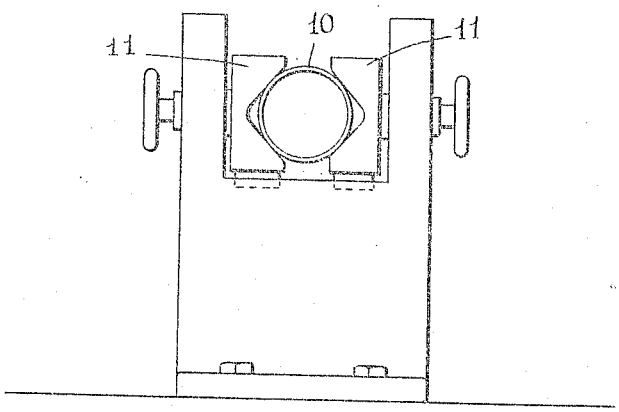
Figure 7:
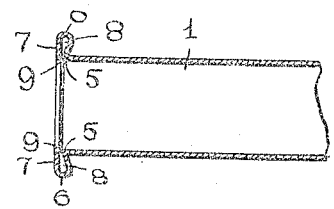

Figure 1 represents two coupled sections of pipe having opposing flanged ends embodying my invention. Fig. 2 is a side view of a pipe-flanging machine by which my improved process of pipe-flanging is accomplished. Figs. 3 and 4 are detailed views of the flanging mechanism, denoting different steps in the process. Fig. 5 is a detached view of the roller-carrying face-plate shown in sectional view on line 5 5, Fig. 2. Fig. 6 is a detached view of the pipe-clamping device, and Fig. 7 represents a flanged end of the pipe shown in section.

Similar reference letters and figures refer to similar parts in the different views.

My present invention relates to an improved form of flange formed upon the ends of metal pipes which are to be coupled together and to the method of making the same.

Referring to the accompanying drawings, 1 2 denote two sections of pipe having their opposing ends flanged and coupled together by coupling-collars 3 3 and coupling-bolts 4 4. My improved pipe-flange is made by turning over the end of a pipe by a sharp bend at 5 5, forming an external flange at an oblique angle to the axis of the pipe and returning the flange upon itself by an inward bend at 6 with the return portion of the flange lying in a plane at right angles to the axis of the pipe, with an inclosed annular space 8 at the outer edge of the flange and preferably with a restricted opening 9 between the bend 5 and the inturn member of the flange, thereby forming a double flange with the inturn members 7 on the adjacent ends of the pipe brought into contact and drawn together by means of coupling collars 3 and bolts 4, as represented in Fig. 1, said coupling-collars 3 being provided with opposing grooved faces adapted to receive and closely fit the outer surfaces of the flanges.

As the opposing surfaces of the inturn members 7 are brought into planes at right angles to the axes of their respective pipes, they form closely-contacting surfaces when coupled together, without requiring in ordinary cases the use of gaskets. The presence of the narrow opening 9 permits the inturn members 7 to slightly yield and compensate for any slight expansion or contraction in the length of the pipe, and the increased thickness of the outer edges of the flanges fitting the grooved face of the clamping-collars 3 3 prevents the flanges from being pulled out of the collars by a longitudinal strain upon the pipe.

My improved pipe-flange is constructed as follows: A section of pipe 10 to be flanged is held between clamping-jaws 11 11, with its end 12 presented to a revolving face-plate 13, provided with diametrical ways 14 for the sliding blocks 15 and 16. The block 15 is capable of being moved radially on the face-plate by the adjusting-screw 17 and hand-wheel 18, and the block 16 is capable of being fastened in any desired position in the ways 14 by means of bolts 19, passing through slots 20 and entering the face-plate. The block 15 carries a stud 21, on which is mounted a roller 22, having a rounded periphery 23, and the block 16 carries a stud 24, on which is loosely held a roller 25, capable of a slight longitudinal movement on the stud 24 and having a concave groove 26. The block 16 is adjusted to cause the periphery of the roller 25 to bear against the outer surface of the pipe, and the roller 22 is inserted within the end of the pipe, and the block 15 is gradually drawn radially outward against the inner surface of the pipe to cause the same to be crowded into the concave groove 26, as shown in Fig. 3, the end of the pipe operated upon being heated and sufficiently plastic to allow it to be shaped between the coacting rolls 22 and 25, as shown in Fig. 3.

The shaping process performed by the rolls 22 and 25 expands the end of the pipe and forms a longitudinal semispherical groove 27. When the groove 27 has been formed, the roller 22 is moved radially inward to the center of the pipe, and the grooved roller 25 is moved radially outward into the position shown in Fig. 4. Held in the ways 14 of the face-plate 13 is a block 28, in which is journaled a roller 29, having its face at right angles to the axis of the face-plate. The block 28 is provided with a projecting arm 30, parallel with the axis of the face-plate and provided with ways for an adjustable block 31, carrying a spindle 32, on which is journaled a roll 33, having a concave face and having its axis at an oblique angle to the axis of the face-plate. The block 31 is adjustable in the arm 30 by means of an adjusting-screw 34 and hand-wheel 35. The block 31 is adjusted to bring the edge of the roll 33 into close contact with the angle formed by the periphery of the pipe and its expanded end, as shown in Fig. 3. The face-plate is then fed along in its bearings toward the end of the pipe by means of a feeding-screw 36, which is rotated by the gears 37, shaft 38, and hand-wheel 39. The feeding motion of the face-plate toward the end of the pipe carries the roller 29 against the expanded end of the pipe. This movement of the face-plate in its bearings necessitates a further adjustment of the roll 33, which must be maintained in close contact with the angle formed by the periphery of the pipe and its expanded end. In this way the completed flange, as shown in Fig. 4, is formed between the roll 33 and the roll 29, with the outwardly-turned member of the flange sharply bent against the concave side of the roll 33 and with the inturn member of the flange brought into a plane at right angles with the axis of the revolving face-plate.

What I claim as my invention, and desire to secure by Letters Patent, is—

1. As an article of manufacture, a pipe having a flange at its end, said flange being turned outwardly at an oblique angle to the axis of the pipe and returned inwardly upon itself, with the inturned portion in a plane at right angles to the axis of the pipe.

2. As an article of manufacture, a pipe having at its end an outwardly-projecting flange integral with the pipe, and consisting of outwardly and inwardly turned sections, with an intervening space between said sections.

3. As an article of manufacture, a pipe having at its end an external flange integral with the pipe and comprising an inwardly-turned elastic section in a plane at right angles to the axis of the pipe.

4. As an article of manufacture, a pipe having its end bent outward at an oblique angle to the axis of the pipe, returned upon itself by an inward bend, with the return portion in a plane at right angles to the axis of the pipe to form a flange, leaving an inclosed annular space at the outer edge of said flange.

5. As an article of manufacture, a pipe having its end bent outwardly at an angle to the axis of the pipe, returned upon itself by an inward bend to form a flange, and with a restricted opening between the outward bend and the inturned member of the flange.

6. As an article of manufacture, a pipe having its end bent outward at an oblique angle to the axis of the pipe, returned upon itself by an inward bend with the return portion in a plane at right angles to the axis of the pipe to form a flange, and with a restricted opening between the outward bend and the inturned end of the pipe.

Dated this 14th day of June, 1905.

LOUIS H. BRINKMAN.

Witnesses:
E. H. TUCKER,
E. D. REDFIELD.